3,122,482
ABSORBABLE SURGICAL POWDER
David F. Smith, Newtown, Conn.
(120 Grove St., Bayhead, N.J.)
No Drawing. Filed Sept. 27, 1957, Ser. No. 686,595
3 Claims. (Cl. 167—92)

For use in surgery, especially to prevent sticking together of surgeons' rubber gloves and to lubricate surgeons' hands as they are inserted into gloves preparatory to an operation, there is required a lubricating powder that can be steam autoclaved or dry heat sterilized and that will resorb in the tissues without deleterious effects. Talc, which has been used in the past, has been shown to cause formation of adhesions and granulomas especially in the peritoneum.

I have discovered that certain types of non-gelling starch compositions make very satisfactory surgical powders. These are phosphated or sulfated starches. However the non-gelling starches alone are not satisfactory since they form clumps upon steam autoclaving. Such clumping can be prevented in ways that are well known, for example by adding to a suitable non-gelling starch a small proportion of finely divided calcium phosphate. I have found, however, that this mixture is not satisfactory as a glove powder because apparently it does not adequately adhere to at least certain types of surgeons' gloves. For example when this type of powder is used and the gloves are washed with soap and water in order to clean them for re-use, they stick together badly as they dry. I assume that this is because after sterilizing a glove coated with a satisfactory powder and even after washing, there still remains enough powder on the glove surface to prevent such sticking.

The addition of about 2 percent of a so-called "light" magnesium oxide in finely divided state and thoroughly mixed with the non-gelling starch has been used satisfactorily with a starch powder made by reaction of starch with epichlorhydrin to make the so-called starch ether. However, with the phosphate or sulfate starches, this simple device does not suffice to meet all the requirements for a surgeons' glove powder as outlined above.

First I wish to describe the types of non-gelling starch which I use as the base for my powder. The phosphated starches are made by the methods of U.S. Patent Number 2,328,537, by Felton and Schopmeyer, issued September 7, 1943; especially by the reaction of starch with phosphorus oxychloride. Similar phosphated starches can be made by reaction of starch with certain polyphosphates. Exactly what occurs in these reactions to yield non-gelling starch derivatives is not known. Presumably, however, the phosphoric acid groups react with the hydroxy groups of the starch molecule to form esters and/or ethers and there are cross linkings between hydroxyl groups which in effect increase the chain length of the starch molecule, or in any case reduce its hydrophilic properties so that products can be obtained which, while they may swell considerably for example in hot water, they do not form a gel when in contact with boiling water over a period of, say, a half hour.

It appears that a phosphated starch containing very few phosphate groups can have its gelling properties much reduced. This can be understood when it is realized that just one phosphate cross-link can double the molecular weight of a starch molecule. Since it is likely that phosphate groups can react with hydroxyl groups in the starch without formation of cross-linkage and thus, probably, without largely affecting the gelling properties of the starch, it can be seen that an analysis of the product for phosphate will not necessarily be a good measure of the gelling properties of the product. It is necessary, therefore, to resort to empirical methods to achieve a satisfactory product. I have found that such starch products are suitable for my purposes if they do not form a gel after heating in boiling water for about one half hour, even though they may swell under this test as much as 100 percent or more.

Sulfated starches suitable for my purposes may be produced in a number of ways. One way is to react a mixture of starch and sodium carbonate with chlorsulfonic acid that has been added slowly to cold pyridine. Another way is to react a mixture of starch and sodium carbonate with sulfuryl chloride either in the liquid or gas phase or mixed with chloroform. Or the starch can be reacted with the sulfuryl chloride in a water slurry of the starch made alkaline with sodium hydroxide and sodium carbonate, the pH being about 11. In case the starch is reacted in a water slurry, as in the case of the phosphated starch, it is necessary to subject the starch to an alkaline condition but not to swell the starch largely else it will be sensitized as to retain too much hydrophilic property after the phosphated or sulfated derivative is formed. Thus when the starch is phosphated or sulfated in an alkaline slurry, in order to obtain a product suitable for my purposes, I limit the degree of swelling of the starch by dissolving in the water used for the slurry a considerable quantity of an inorganic salt like sodium chloride or, better, sodium sulfate. Thus in the case of either the phosphate or the sulfate reaction, I must activate the starch with alkali but limit the normal tendency for the starch to swell excessively in contact with an alkaline solution; this I do by the use of a strong electrolyte as indicated.

After either the phosphated or the sulfated starch is formed as described, the usual procedure is to separate the starch in the form of a water slurry and wash it thoroughly with water to remove inorganic salts and other water soluble materials. The starch slurry can then be adjusted as required to an approximately neutral pH. If, however, either before or after such washing, the reaction product is acidified, for example with HCl, and then thoroughly washed essentially nothing remains except a slightly acid reacting starch, which can then be neutralized with any strong alkali. If the alkali is sodium hydroxide one obtains the sodium salt of the starch phosphate or sulfate. I have found, however, that in order to obtain a product suitable for my purposes, I must form the calcium salt of the starch phosphate or sulfate. Even if I thus form the magnesium salt by neutralizing with magnesium oxide or hydroxide, dry the product and mix with it 2 percent of a suitable magnesium oxide the resulting composition clumps badly upon steam autoclaving. Even if I add magnesium oxide and calcium phosphate to the magnesium starch phosphate, the product clumps badly upon steam autoclaving. Furthermore I find that the phosphated or sulfated starch must contain from 0.15 to about 1.0 percent calcium in order to obtain a product which when mixed with magnesium oxide to the extent of about 2 percent, will give a satisfactory product.

To summarize, the product of this invention is a phosphated or a sulphated starch made by the methods described that does not gel when in contact with boiling water for a period of at least 15 minutes, that is a calcium starch phosphate or sulfate made by neutralization of the starch acid phosphate or sulfate and intimately mixed (preferably by stirring in a water slurry) with from 1 to 3 percent of a finely divided or "light" magnesium oxide. In using a solution of an electrolyte to limit swelling of the starch in the alkaline solution during the phosphating or sulfating reaction, I may use, for example, a 16 to 20 percent NaCl or $Na_2SO_4$ solution although this is not critical. The magnesium oxide used as additive may be of less than 1 micron particle size or from 1 to 5 microns but some larger particles may be present. Normally I use corn starch although other starches may be used. As far as I know my magnesium starch sulfate and calcium starch sulfate are compounds not prepared previously. My compositions also have other uses, for example in offset printing and as mold release agents. While the calcium content of the calcium starch phosphate or sulfate may vary from 0.15 to 1.0 percent or even to 2.0 percent, a practical optimum is about 0.25 percent calcium.

It is found also that the iron, barium and zinc salts of the starch acid phosphates and starch acid sulfates are of value as surgical powders.

The calcium or other metal content of the starch metal phosphates and starch metal sulfates, after washing to remove the excess calcium or other hydroxides used to neutralize the starch acid phosphates or sulfates, is a measure of the degree to which the starch is phosphated or sulfated.

The added magnesium oxide is a component of the finished composition. The phosphorylated starch is acidified to wash out all soluble material including inorganic salts. This leaves a phosphated starch with at least some acid phosphate groups attached to the starch molecule. These acid groups are then neutralized with $Ca(OH)_2$ to form calcium starch phosphate. To the latter is then added MgO. Since calcium starch phosphate and MgO are both relatively insoluble in water, the product can be washed with moderate amounts of pure water without removing appreciable amounts of either the calcium starch phosphate or the MgO, although large amounts of water will tend to cause hydrolysis of the calcium starch phosphate with loss of calcium.

What I claim is:

1. A dry, essentially water-insoluble, non-gelling powder composition comprising a phosphate cross-linked starch containing from 0.15 to 2 percent calcium as a phosphate salt, intimately mixed with from 1 to 3 percent of light magnesium oxide.

2. A dry, essentially water-insoluble, non-gelling phosphated starch powder containing from 0.15 to 2 percent calcium as calcium starch phosphate, intimately mixed with from 1 to 3 percent light magnesium oxide.

3. The method of making a surgeons' glove powder composition which does not form hard clumps during steam sterilization, which is absorbable and relatively non-irritating in live animal tissue and which imparts resistance against sticking-together of surgeons' gloves after steam sterilization in contact therewith and after subsequent washing and drying for re-use; said method comprising the steps of (1) reacting starch under alkaline conditions in the presence of an electrolyte, with phosphorus oxychloride until the product no longer forms a gel upon heating in boiling water for at least 15 minutes; (2) acidifying and washing the product of step (1) with water to remove soluble materials; (3) neutralizing the product of step (2) with calcium hydroxide; (4) washing the product of step (3) with water to remove any remaining calcium hydroxide; (5) intimately mixing the product of step (4) with from 1 to 3 percent of light magnesium oxide; and (6) drying the product of step (5) at a low temperature.

References Cited in the file of this patent

UNITED STATES PATENTS

| | | |
|---|---|---|
| 1,077,131 | English | Oct. 28, 1913 |
| 2,188,494 | Bode | Jan. 30, 1940 |
| 2,252,479 | Beyer | Aug. 12, 1941 |
| 2,350,653 | Walsh et al. | June 6, 1944 |
| 2,538,903 | Gaver | Jan. 23, 1951 |
| 2,614,945 | Krisan | Oct. 21, 1952 |
| 2,626,257 | Caldwell | Jan. 20, 1953 |
| 2,697,093 | Jones | Dec. 14, 1954 |
| 2,725,301 | Mayer et al. | Nov. 25, 1955 |
| 2,775,586 | Paschall | Dec. 25, 1956 |
| 2,801,242 | Kerr | July 30, 1957 |
| 2,938,901 | Kerr | May 31, 1960 |

FOREIGN PATENTS

| | | |
|---|---|---|
| 510,415 | Canada | Feb. 22, 1955 |